(12) United States Patent
Lin

(10) Patent No.: US 8,578,559 B2
(45) Date of Patent: Nov. 12, 2013

(54) HINGE MECHANISM AND CLAMSHELL DEVICE THEREOF

(75) Inventor: Yu-Wei Lin, New Taipei (TW)

(73) Assignee: Wistron Corporation, Taipei Hsien (TW)

( * ) Notice: Subject to any disclaimer, the term of this patent is extended or adjusted under 35 U.S.C. 154(b) by 0 days.

(21) Appl. No.: 13/303,274

(22) Filed: Nov. 23, 2011

(65) Prior Publication Data

US 2012/0205368 A1 Aug. 16, 2012

(30) Foreign Application Priority Data

Feb. 10, 2011 (TW) .............................. 100104448 A

(51) Int. Cl.
*E05F 1/08* (2006.01)

(52) U.S. Cl.
USPC .................................. 16/307; 16/304; 16/306

(58) Field of Classification Search
USPC .................................... 16/304, 306–308, 285
See application file for complete search history.

(56) References Cited

U.S. PATENT DOCUMENTS

| | | | | |
|---|---|---|---|---|
| 5,406,678 | A | * | 4/1995 | Kaden et al. .................... 16/342 |
| 5,542,505 | A | * | 8/1996 | Kempf ......................... 188/77 W |
| 6,033,015 | A | * | 3/2000 | Husted ...................... 297/188.19 |
| 6,601,269 | B2 | * | 8/2003 | Oshima et al. .................. 16/342 |
| 6,895,637 | B2 | * | 5/2005 | Lu .................................. 16/285 |
| 2002/0133907 | A1 | | 9/2002 | Oshima et al. |
| 2004/0064919 | A1 | | 4/2004 | Lu |
| 2009/0260187 | A1 | * | 10/2009 | Wang et al. ..................... 16/307 |

OTHER PUBLICATIONS

Office Action of corresponding TW application No. 100104448, Jul. 10, 2013.

* cited by examiner

*Primary Examiner* — Victor Batson
*Assistant Examiner* — Matthew Sullivan
(74) *Attorney, Agent, or Firm* — Bacon & Thomas, PLLC

(57) ABSTRACT

A hinge mechanism and a clamshell device thereof are disclosed. The clamshell device includes a first cover and a second cover and the first cover can rotate with respect to the second cover via the hinge mechanism. The hinge mechanism includes a main body, an elastic component, and a base. The main body is connected to the first cover and includes a shaft and a projecting part. The elastic component covers the shaft. An internal diameter of the elastic component matches with an outer diameter of the shaft so as to generate a friction force. The first cover can be maintained at any angle by the friction force. The elastic component has a groove used for connecting with the projecting part when the main body rotates to a specific angle. The base is connected to the second cover and has a stop structure used for fixing the elastic component.

20 Claims, 7 Drawing Sheets

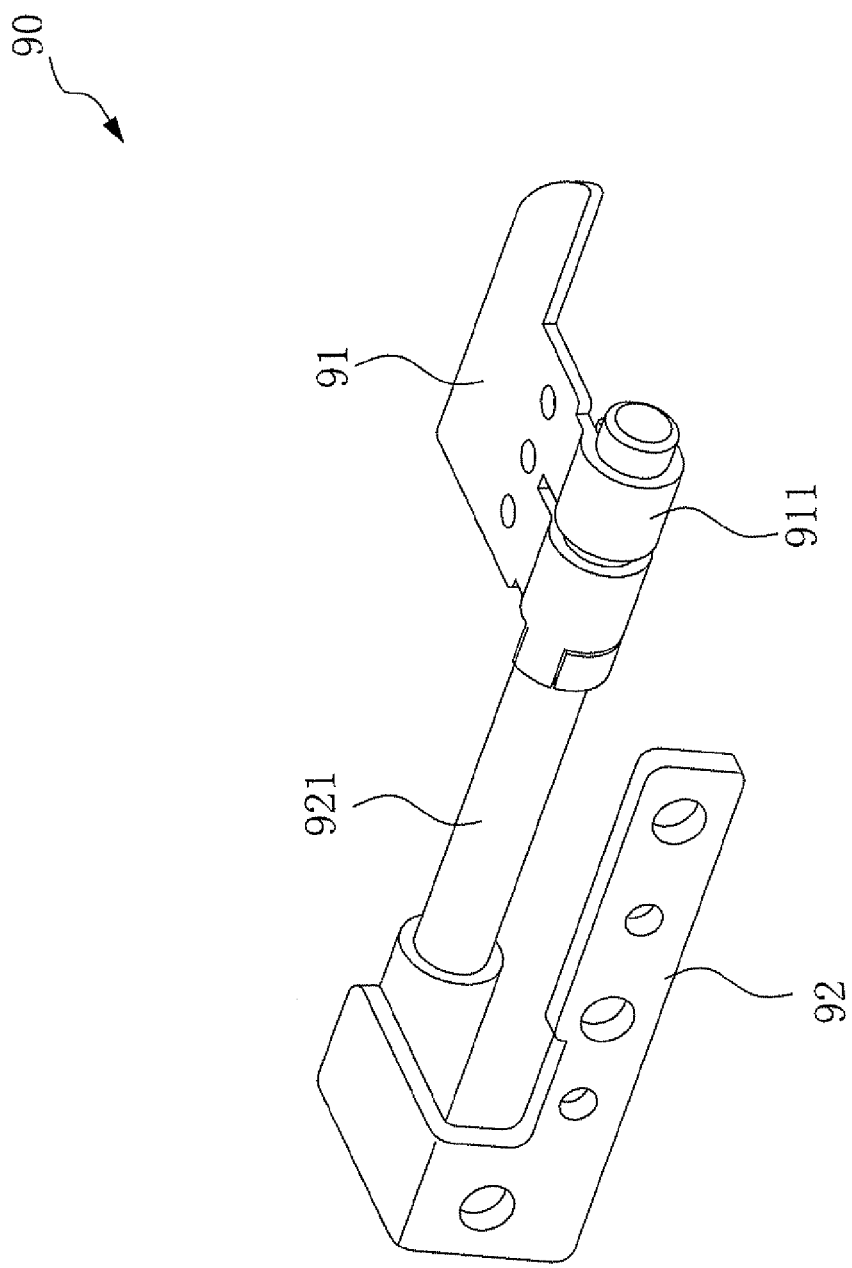
FIG.1B (Prior Atr)

HINGE MECHANISM AND CLAMSHELL DEVICE THEREOF

BACKGROUND OF THE INVENTION

1. Field of the Invention

The present invention relates to a hinge mechanism and a clamshell device having the same; more particularly, the present invention relates to a hinge mechanism with a smaller volume and capable of achieving automatic engaging effect, and a clamshell device having the hinge mechanism.

2. Description of the Related Art

For modern mechanism devices, clamshell devices have been frequently used in daily lives. A first cover and a second cover of the clamshell device are mutually connected via a hinge structure, such that the first cover and the second cover can rotate relative to each other. The purpose of utilizing the hinge structure of the clamshell device to generate a torque can usually be achieved by means of a washer type structure or a double-pack type structure.

First, please refer to FIG. 1A, which illustrates a structure diagram of a conventional washer type hinge mechanism in the prior art.

The conventional washer type hinge mechanism 80 comprises a first component 81, a second component 82 and stack washers 83. The first component 81 and the second component 82 are pivoted to each other, and a friction force can be generated via the stack washers 83, wherein the friction force is the torque that a user needs to apply while opening or closing the clamshell device. In the prior art, in order to achieve the effect that the first cover and the second cover are engaged with each other at a specific position, the first component 81 and the second component 82 respectively have a first concave-convex wheel 811 and a second concave-convex wheel 821. When the first component 81 and the second component 82 relatively rotate to a specific angle (such as when the clamshell device are completely closed), position-limiting effect can be achieved by means of engaging the first concave-convex wheel 811 with the second concave-convex wheel 821.

Because the stack washers 83, the first concave-convex wheel 811 and the second concave-convex wheel 821 are all in specific volumes, the conventional washer type hinge mechanism 80 has a bigger size. As the clamshell device is getting smaller and compact in size, utilizing the washer type hinge mechanism 80 may limit the structure design.

Then, please refer to FIG. 1B, which illustrates a structure diagram of a conventional double-pack type hinge mechanism in the prior art.

The double-pack type hinge mechanism 90 comprises a first component 91 and a second component 92. Partial structure of the first component 91 is bent to form a sleeve 911, and is sleeved onto a main body 921 of the second component 92, such that the first component 91 and the second component 92 can rotate relative to each other. When the first component 91 is rotating with respect to the second component 92, a friction force can be generated through the contact between the inner surface of the sleeve 911 and the outer surface of the main body 921, wherein the friction force can be converted to the torque required by the double-pack type hinge mechanism 90.

Although the volume of the double-pack type hinge mechanism 90 can be designed smaller than the volume of the aforementioned washer type hinge mechanism 80, the first component 91 and the second component 92 of the conventional double-pack type hinge mechanism 90 cannot achieve position-limiting effect at a specific position.

Therefore, there is a need to provide a hinge mechanism with a smaller volume and capable of achieving position-limiting effect at a specific position, and a clamshell device having the hinge mechanism to mitigate and/or obviate the aforementioned problems.

SUMMARY OF THE INVENTION

It is an object of the present invention to provide a hinge mechanism with a smaller volume and reduced components as well as capable of achieving position-limiting effect at a specific position.

It is another object of the present invention to provide a clamshell device having the aforementioned hinge mechanism.

To achieve the abovementioned objects, the hinge mechanism of the present invention is used in the clamshell device. The clamshell device comprises a first cover and a second cover. The first cover can rotate with respect to the second cover via the hinge mechanism. The hinge mechanism comprises a main body, an elastic component and a base. The main body is connected to the first cover, and the main body comprises a shaft and a projecting part. The elastic component covers the shaft of the main body. An internal diameter of the elastic component matches with an outer diameter of the shaft so as to generate a friction force. The first cover can be maintained at any angle by the friction force. The elastic component comprises a groove used for connecting with the projecting part when the main body rotates to a specific angle. The base is connected to the second cover and comprises a stop structure used for fixing the elastic component.

The clamshell device of the present invention comprises a first cover, a second cover and a hinge mechanism. The hinge mechanism is connected to the first cover and the second cover, such that the first cover can rotate with respect to the second cover. The hinge mechanism comprises a main body, an elastic component and a base. The main body is connected to the first cover, and the main body comprises a shaft and a projecting part. The elastic component covers the shaft of the main body. An internal diameter of the elastic component matches with an outer diameter of the shaft so as to generate a friction force. The first cover can be maintained at any angle by the friction force. The elastic component comprises a groove used for connecting with the projecting part when the main body rotates to a specific angle. The base is connected to the second cover and comprises a stop structure used for fixing the elastic component.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views:

FIG. 1B illustrates a structure diagram of a conventional double-pack type hinge mechanism in the prior art.

DETAILED DESCRIPTION OF THE PREFERRED EMBODIMENT

Figure 1A:
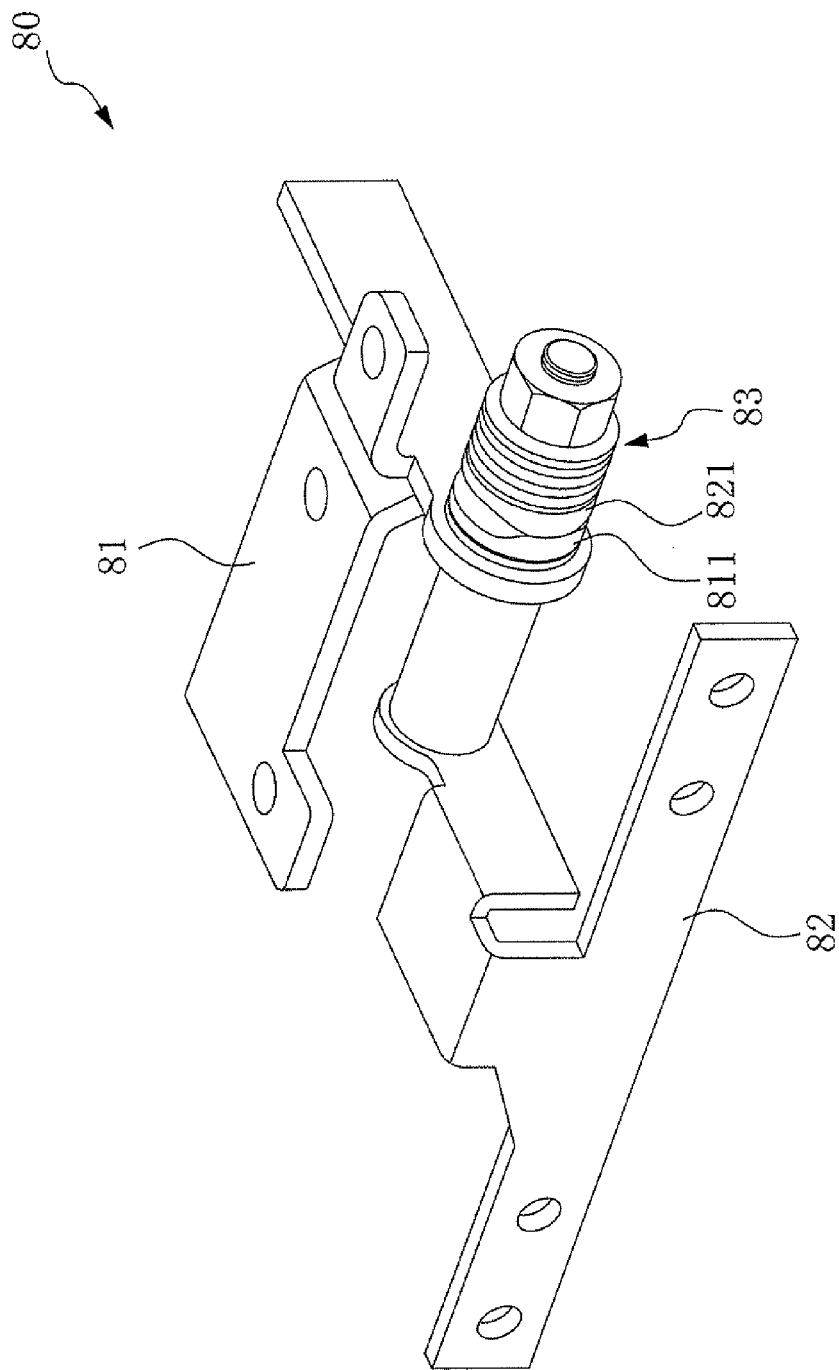
FIG. 1A illustrates a structure diagram of a conventional washer type hinge mechanism in the prior art.
Figure 2:
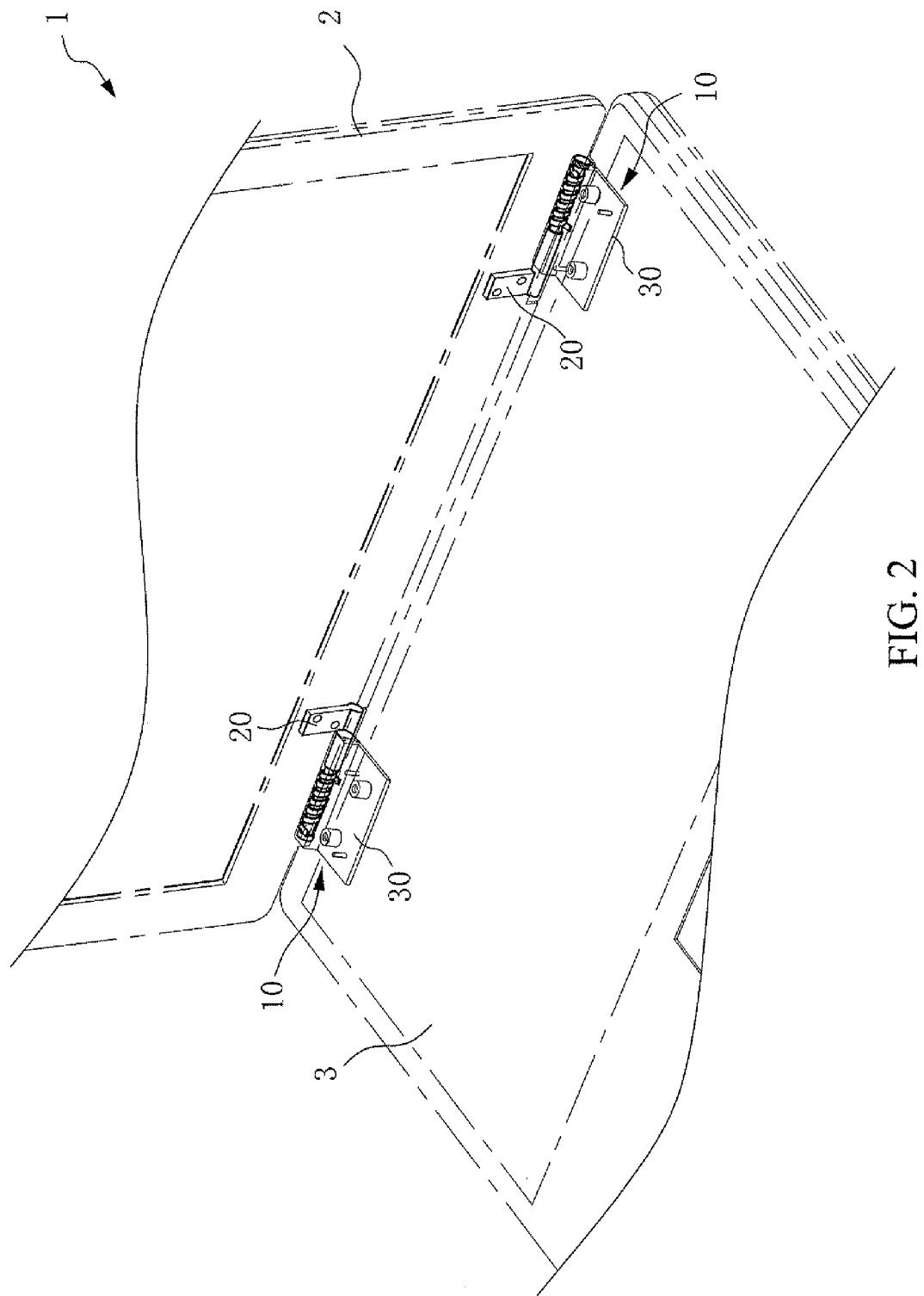
FIG. 2 illustrates a schematic drawing of a clamshell device according to one embodiment of the present invention.

Please refer to FIG. 2, which illustrates a schematic drawing of a clamshell device according to one embodiment of the present invention. The clamshell device 1 of the present invention comprises a first cover 2, a second cover 3 and a hinge mechanism 10. The hinge mechanism 10 is used for connecting the first cover 2 and the second cover 3 of the clamshell device 1, such that the first cover 2 can rotate with respect to the second cover 3.

For example, the clamshell device 1 can be a laptop computer, a cellular phone or other equivalent device. As an example, in FIG. 2, the clamshell device 1 is a laptop computer, the first cover 2 is a top cover of the laptop computer, and the second cover 3 is a bottom cover of the laptop computer. However, please note the scope of the present invention is not limited to the above description. Further, the clamshell device 1 of the present invention is not limited to be an electronic device. In this embodiment, the clamshell device 1 comprises two hinge mechanisms 10. However, the number of the hinge mechanisms 10 of the clamshell device 1 may vary according to practical design needs without being limited to only single or two hinge mechanisms 10.

Figure 3:
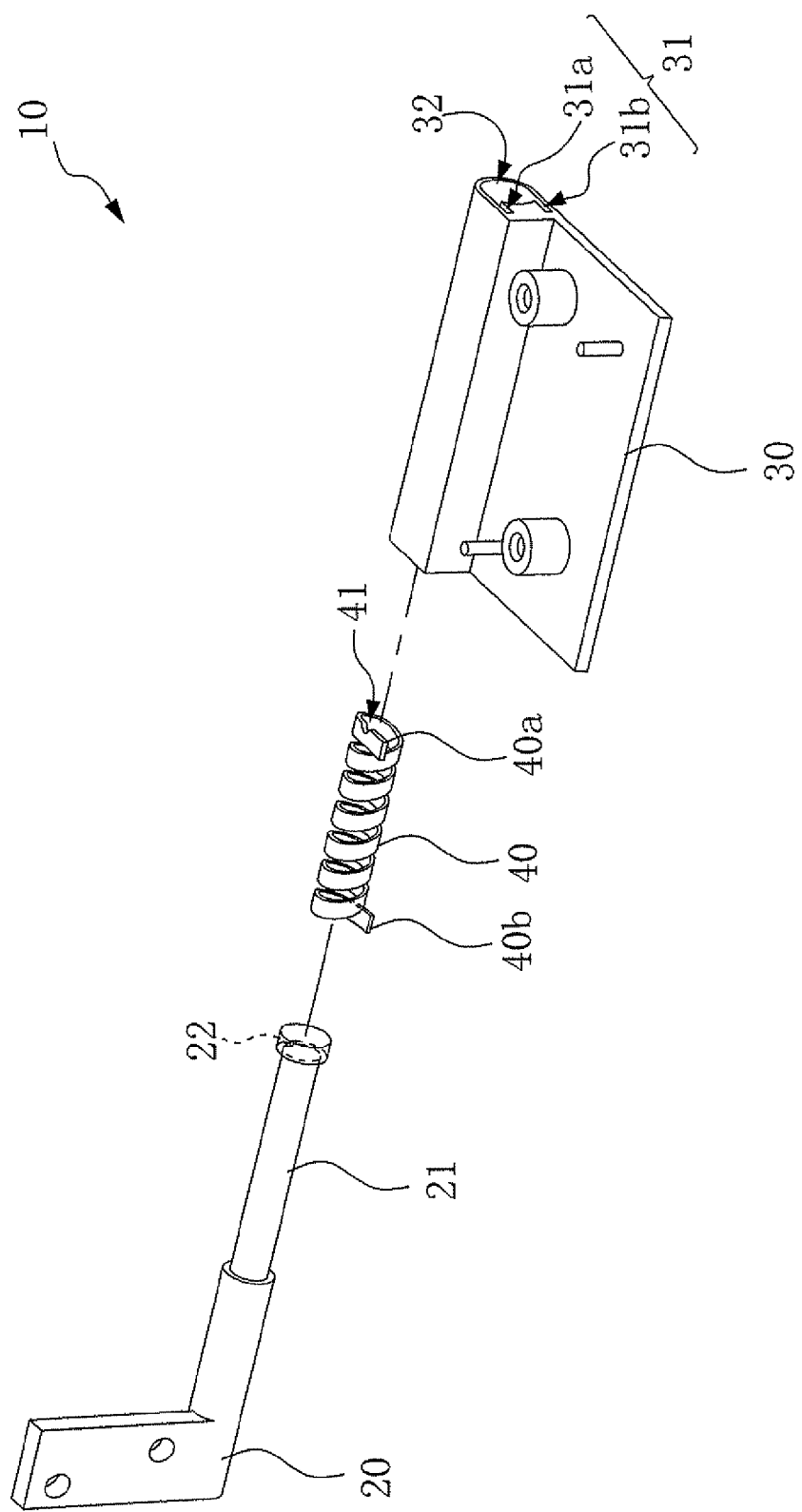
FIG. 3 illustrates an exploded view of a hinge mechanism according to one embodiment of the present invention.
Figure 4:
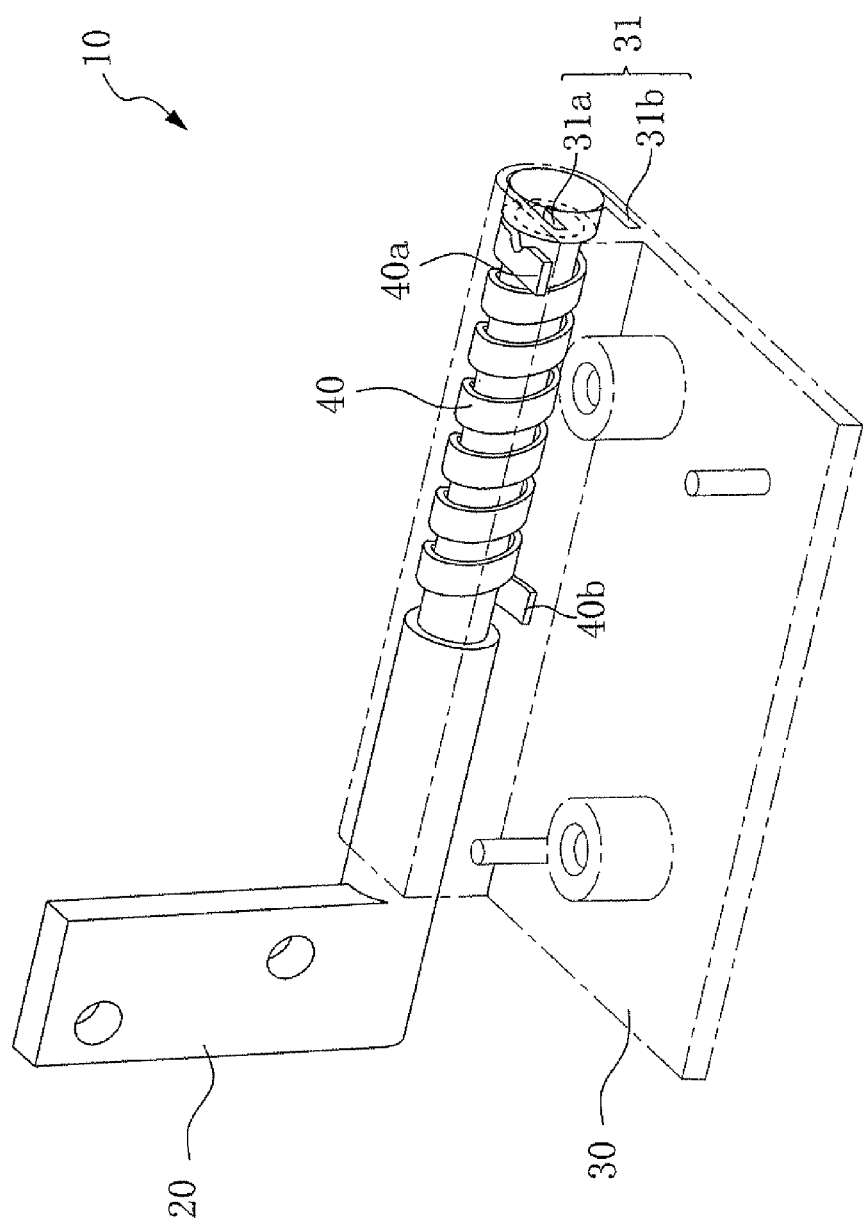
FIG. 4 illustrates a perspective view of the hinge mechanism according to one embodiment of the present invention.

Please refer to FIG. 3 and FIG. 4 for further explanation about the detailed structure of the hinge mechanism 10. FIG. 3 illustrates an exploded view of a hinge mechanism according to one embodiment of the present invention. FIG. 4 illustrates a perspective view of the hinge mechanism according to one embodiment of the present invention.

The hinge mechanism 10 comprises a main body 20, a base 30 and an elastic component 40. As shown in FIG. 2, the main body 20 is connected to the first cover 2, and the base 30 is connected to the second cover 3.

The main body 20 comprises a shaft 21 and a projecting part 22. An outer diameter of the shaft 21 matches with an internal diameter of the elastic component. The elastic component 40 covers the exterior of the shaft 21. The shaft 21 can rotate with respect relative to the elastic component 40. The difference between the outer diameter of the shaft 21 and the internal diameter of the elastic component 40 is smaller than 0.3 mm, such that when the shaft 21 rotates with respect to the elastic component 40, a friction force would be generated within the outer diameter of the shaft 21 and the internal diameter of the elastic component 40.

The projecting part 22 is disposed to one end of the shaft 21. In this embodiment, the main body 20 is fastened and connected to the first cover 2 via a screw, but please note the scope of the present invention is not limited to the above description. When the first cover 2 rotates with respect to the second cover 3, the main body 20 would also rotate with respect to the base 30.

In this embodiment, the base 30 is fastened and connected to the second cover 3 via a screw, but please note the scope of the present invention is not limited to the above description. The base 30 has a stop structure 31 used for fixing a first end 40a and a second end 40b of the elastic component 40, so as to prevent the elastic component 40 from synchronously rotating with the shaft 21 when the shaft 21 rotates. In one embodiment of the present invention, the stop structure 31 comprises a first slot 31a and a second slot 31b. The first end 40a and the second end 40b of the elastic component 40 are respectively installed in the first slot 31a and the second slot 31b of the stop structure 31, such that the first end 40a and the second end 40b of the elastic component 40 can be fixed by means of the structures of the first slot 31a and the second slot 31b. In this embodiment, the first end 40a and the second end 40b of the elastic component 40 are respectively arranged in the first slot 31a and the second slot 31b. However, please note the stop structure 31 of the hinge mechanism 10 of the present invention is not limited to the above description.

In this embodiment, the base 30 comprises a containing structure 32 used for stowing the shaft 21 and the elastic component 40, such that the shaft 21 can directly rotate within the containing structure 32. In this embodiment, the containing structure 32 is a through hole, and is connected through the first slot 31a and the second slot 31b of the stop structure 31. However, please note the containing structure 32 of the hinge mechanism 10 of the present invention is not limited to the above description.

In one embodiment of the present invention, the elastic component 40 is, but not limited to, a plate-type helical spring. The elastic component 40 can generate a spring tension according to the material and structure of its own. The elastic component 40 covers the shaft 21, and the internal diameter of the elastic component 40 matches with the outer diameter of the shaft 21. The difference between the outer diameter of the shaft 21 and the internal diameter of the elastic component 40 is smaller than 0.3 mm, such that an appropriate friction force would be generated between the elastic component 40 and the shaft 21. More precisely, the appropriate friction force would directly influence the force that the user needs to apply while rotating the top cover 2 with respect to the bottom cover 3 of the clamshell device 1.

The elastic component 40 comprises a groove 41. The shape of the groove 41 corresponds to the projecting part 22 of the shaft 21. When the shaft 21 rotates to a specific angle, the projecting part 22 and the groove 41 are connected with each other so as to generate fastening effect.

Figure 5A:
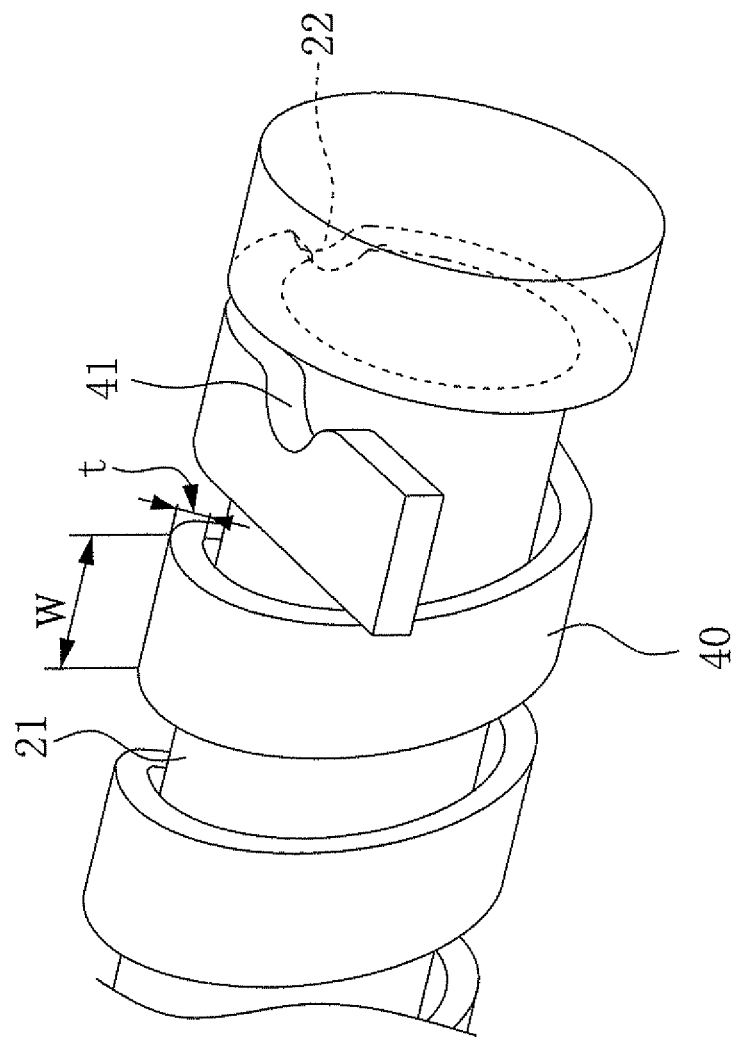
FIG. 5A illustrates a schematic drawing showing a projecting part and a groove of the hinge mechanism are not engaged according to the present invention.
Figure 5B:
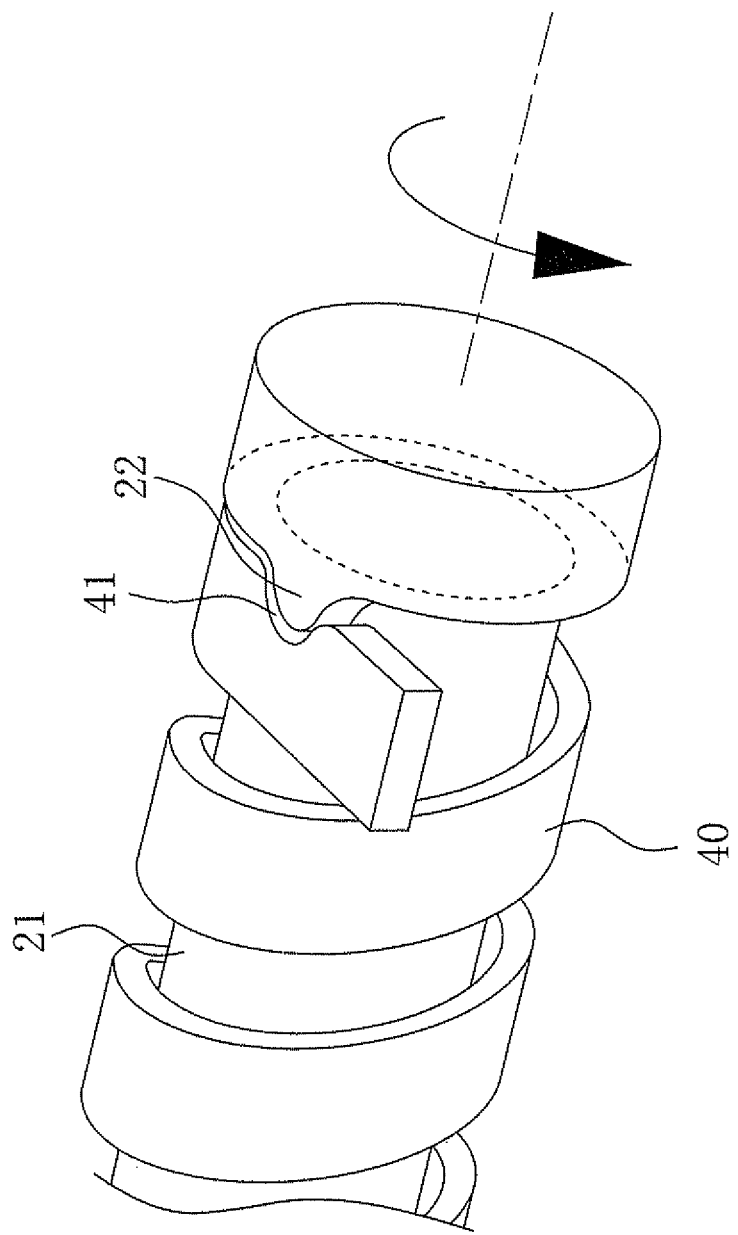
FIG. 5B illustrates a schematic drawing showing the projecting part and the groove of the hinge mechanism are engaged according to the present invention.

Please refer to FIG. 5A and FIG. 5B for more details about the actions of the projecting part 22 and the groove 41. FIG. 5A illustrates a schematic drawing showing a projecting part and a groove of the hinge mechanism are not engaged according to the present invention. FIG. 5B illustrates a schematic drawing showing the projecting part and the groove of the hinge mechanism are engaged according to the present invention. Please also note that the elastic component 40 is a plate-type helical spring in this embodiment, but the scope of the present invention is not limited to the above description.

The shapes of the projecting part 22 and the groove 41 match with each other. In this embodiment, the projecting part 22 can be a semicircular projecting part, and the groove 41 can be a semicircular groove, but please note the shapes of the projecting part 22 and the groove 41 of the present invention are not limited to the above description. For example, partial edge of the projecting part 22 can be designed as an oblique angle for the ease of being engaged with the groove 41. The projecting part 22 is adjacent to one end of the shaft 21, and the groove 41 is adjacent to one end of the elastic component 40. In this embodiment, the groove 41 is adjacent to the first end 40a. The position where the projecting part 22 is installed on the shaft 21 corresponds to the position where the groove 41 is installed on the elastic component 40. If the projecting part 22 and the groove 41 are not engaged, the projecting part 22 contacts the edge of the elastic component 40. When the main body 20 rotates (as along the rotation direction shown in FIG. 5B), the projecting part 22 slides along the edge of the elastic component 40. Then, when the main body 20 rotates to a specific angle, the projecting part 22 and the groove 41 are engaged with each other so as to generate fastening effect (as shown in FIG. 5B). The fastening force of the projecting part 22 and the groove 41 is generated by the spring tension. Please note that the scope of the present invention is not limited to single projecting part 22 and single groove 41. For example, the projecting parts can also be installed in both ends of the shaft 21, and corresponding grooves can be installed in both ends of the elastic component 40.

According to the abovementioned structure, when the first cover 2 rotates, a rotational friction force is generated between the elastic component 40 and the shaft 21. Meanwhile, the projecting part 22 of the shaft 21 pushes the elastic component 40, such that the elastic component 40 can generate an axial friction force and a spring tension as shown in FIG. 5A. The abovementioned friction force and spring tension can be used as the torque generated between the shaft 21 and the elastic component 40, such that the first cover 2 can be maintained at any angle. In this embodiment, when the clamshell device 1 is substantially closed, the shaft 21 of the main body 20 would rotate to the specific angle, such that the projecting part 22 and the groove 41 are engaged with each other so as to generate the fastening effect. Accordingly, the first cover 2 and the second cover 3 can be engaged with each other.

The strength of the friction force between the elastic component 40 and the shaft 20 may vary according to different practical needs. For example, the friction force can be adjusted according but not limited to the elasticity, the internal diameter size, the width W or the thickness t of the elastic component 40. When the shaft 21 rotates, the projecting part 22 pushes the elastic component 40, such that the spring tension generated by the elastic component 40 can keep the first cover 2 being maintained at any angle.

The hinge mechanism 10 of the present invention not only provides the rotational friction force according to the internal diameter size of the elastic component 40, but also provides the axial friction force and the spring tension for being used as the source of the torque. Comparing to the prior art that the double-pack type hinge mechanism 90 can only utilize the rotational friction force as the torque, the hinge mechanism 10 of the present invention can adjust the strength of required torque according to the elasticity, the internal diameter size, the width W, the thickness t and the spring tension of the elastic component 40. Therefore, the hinge mechanism 10 of the present invention is advantageous in its mechanism design.

According to the above description, the clamshell device 1 and the hinge mechanism 10 of the present invention can automatically engage components to generate the fastening effect. The hinge mechanism providing the torque required by the clamshell device can be easily implemented only by changing the structure of the elastic component 40. Further, the hinge mechanism 10 of the present invention has relatively fewer components, and is smaller in size. The present invention can reduce the manufacturing and assembling cost, and can adjust the strength of the torque according to different product needs in a move convenient way.

Although the present invention has been explained in relation to its preferred embodiments, it is to be understood that many other possible modifications and variations can be made without departing from the spirit and scope of the invention as hereinafter claimed.

What is claimed is:

1. A hinge mechanism used in a clamshell device, the clamshell device comprising a first cover and a second cover, wherein the first cover can rotate with respect to the second cover via the hinge mechanism, the hinge mechanism comprising:
   a main body connected to the first cover, the main body comprising a shaft and a projecting part;
   an elastic component covering the shaft of the main body, an internal diameter of the elastic component matching with an outer diameter of the shaft so as to generate a friction force, wherein the first cover can be maintained at any angle by the friction force; the elastic component comprising a groove used for connecting the projecting part when the shaft of the main body rotates to a specific angle; wherein when the shaft of the main body does not rotate to the specific angle, the projecting part does not engage with the groove; and
   a base connected to the second cover, the base comprising a stop structure used for fixing the elastic component.

2. The hinge mechanism as claimed in claim 1, wherein the elastic component is a plate-type helical spring.

3. The hinge mechanism as claimed in claim 2, wherein the base further comprises a containing structure used for stowing the main body and the elastic component.

4. The hinge mechanism as claimed in claim 3, wherein the stop structure is at least one slot.

5. The hinge mechanism as claimed in claim 4, wherein the containing structure is connected through the at least one slot.

6. The hinge mechanism as claimed in claim 5, wherein the projecting part is adjacent to one end of the shaft, and the groove is adjacent to one end of the elastic component.

7. The hinge mechanism as claimed in claim 6, wherein when the shaft of the main body rotates to the specific angle, the first cover and the second cover are substantially closed.

8. The hinge mechanism as claimed in claim 1, wherein the difference between the internal diameter of the elastic component and the outer diameter of the shaft is smaller than 0.3 mm.

9. The hinge mechanism as claimed in claim 8, wherein the projecting part is a semicircular projecting part, and the groove is a semicircular groove.

10. The hinge mechanism as claimed in claim 1, wherein the elastic component is a plate-type helical spring, and the projecting part can slide along the edge of the plate-type helical spring.

11. A clamshell device comprising:
   a first cover;
   a second cover; and
   a hinge mechanism connected to the first cover and the second cover, such that the first cover can rotate with respect to the second cover, the hinge mechanism comprising:
      a main body connected to the first cover, the main body comprising a shaft and a projecting part;
      an elastic component covering the shaft of the main body, an internal diameter of the elastic component matching with an outer diameter of the shaft so as to generate a friction force, wherein the first cover can be maintained at any angle by the friction force; the elastic component comprising a groove used for connecting with the projecting part when the shaft of the main body rotates to a specific angle; wherein when the shaft of the main body does not rotate to the specific angle, the projecting part does not engage with the groove; and a base connected to the second cover, the base comprising a stop structure used for fixing the elastic component.

12. The clamshell device as claimed in claim 11, wherein the elastic component is a plate-type helical spring.

13. The clamshell device as claimed in claim 12, wherein the base further comprises a containing structure used for stowing the main body and the elastic component.

14. The clamshell device as claimed in claim 13, wherein the stop structure is at least one slot.

15. The clamshell device as claimed in claim 14, wherein the containing structure is connected through the at least one slot.

16. The clamshell device as claimed in claim 15, wherein the projecting part is adjacent to one end of the shaft, and the groove is adjacent to one end of the elastic component.

17. The clamshell device as claimed in claim 16, wherein when the shaft of the main body rotates to the specific angle, the first cover and the second cover are substantially closed.

18. The clamshell device as claimed in claim 11, wherein the difference between the internal diameter of the elastic component and the outer diameter of the shaft is smaller than 0.3 mm.

19. The clamshell device as claimed in claim 18, wherein the projecting part is a semicircular projecting part, and the groove is a semicircular groove.

20. The clamshell device as claimed in claim 11, wherein the elastic component is a plate-type helical spring, and the projecting part can slide along the edge of the plate-type helical spring.

* * * * *